Sept. 30, 1969    R. L. BAILEY    3,469,728
HANDLE DEVICE
Filed April 21, 1967
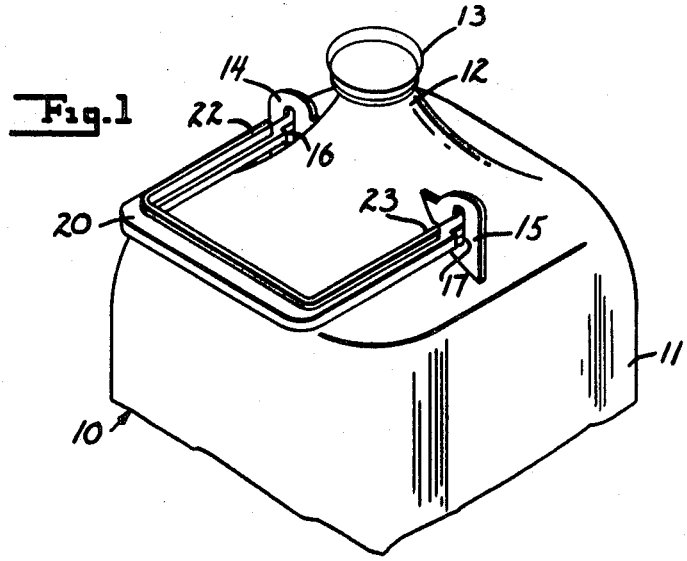
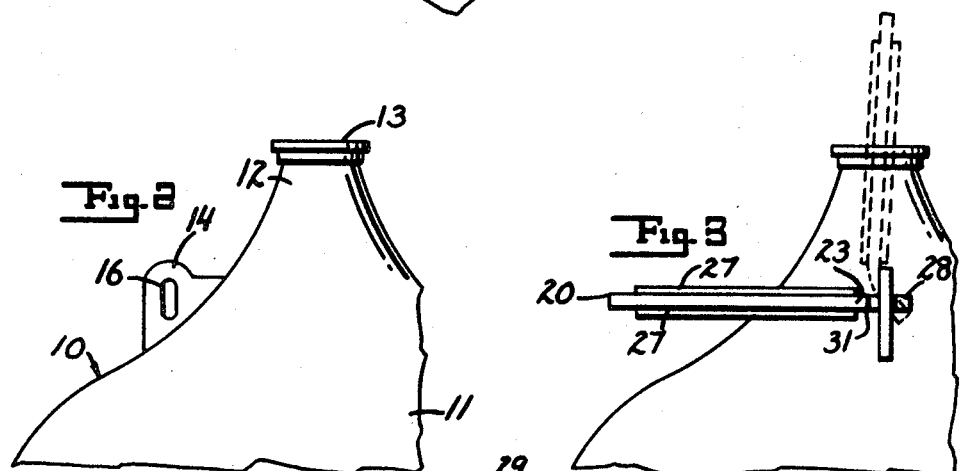
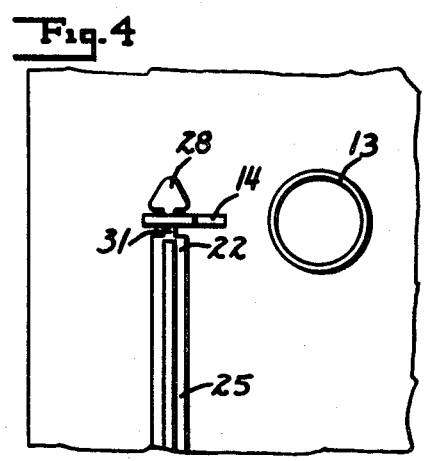
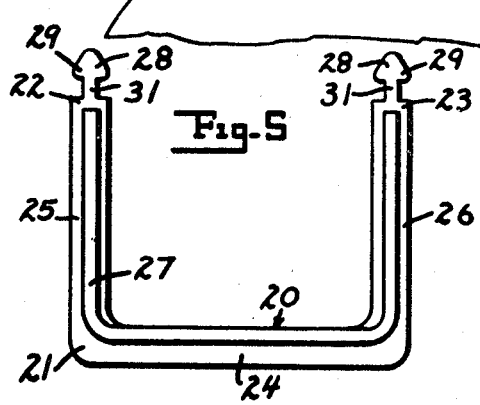
INVENTOR.
ROBERT L. BAILEY

United States Patent Office 3,469,728
Patented Sept. 30, 1969

3,469,728
HANDLE DEVICE
Robert L. Bailey, Spokane, Wash., assignor to National
Distillers and Chemical Corporation, New York, N.Y.
Filed Apr. 21, 1967, Ser. No. 632,754
Int. Cl. B65d 33/06
U.S. Cl. 215—100                                   1 Claim

ABSTRACT OF THE DISCLOSURE

The disclosure describes a handle device for a plastic jug 10 that is especially designed as a container for milk. Tab members 14 and 15 are integrally molded with the jug 10. Elongated apertures 16 and 17 are formed perpendicularly through tab members 14 and 15 respectively for receiving a handle 20. The handle 20 has a U-shaped body portion with resilient ends 23 and 24 extending therefrom. Each of the ends 22 and 23 is angularly displaced in relationship with the orientation of the apertures 16 and 17. Each end 22 and 23 has a tip portion 28 that is dart-shaped for inserting through one of the apertures and an intermediate portion 31 for residing in the apertures to permit the ends to spring back to interlock the tip portions with the tab members.

Background of the invention

In the milk industry, molded plastic bottles are becoming more and more used as containers for milk. Gallon plastic bottles or jugs are rapidly replacing glass bottles because the plastic jugs are unbreakable and are extremely lightweight. One of the principal problems encountered in using plastic containers for milk is to provide a convenient, inexpensive, and sturdy handle means for grasping and carrying the plastic container. The handle means must not be easily broken or detachable from the bottle. Otherwise, the cost of maintaining the plastic container will outweigh its advantages. Furthermore, the handle means should not interfere with the filling and emptying of the plastic jugs.

Many different types of handle means have been tried and discarded. Presently, the plastic jugs are provided with a handle means that is integrally compression-molded with the bottle. The handle means extends substantially upright in an arch over the bottle opening and is capable of being temporarily deflected to the side when filling and emptying the container. Even though the integral handle means is inexpensive, sturdy, and is not detachable, it is not totally satisfactory. If the handle means is broken the bottle has to be discarded because the handle and the bottle form an integral unit. In emptying the bottle the user is required to use both hands, one to hold the bottle and the other to hold the handle means to the side of the opening while pivoting the bottle. When manufactured, the handle must be initially set in a deflected position so as to not interfere with normal filling processes.

As is generally known, the milk processing industry is extremely competitive and a fraction of a cent saving in the procurement, use and maintenance of the milk containers may mean the difference between success and failure for the milk processor.

Object and summary of the invention

One of the principal objects of this invention is to provide a handle device that when released will move to a position spaced from and below the bottle opening to facilitate the filling and emptying of the bottle.

Another principal object of this invention is to provide a handle device that has a detachable handle that may be replaced when broken.

An additional object of this invention is to provide a detachable handle that may be secured and easily attached to the bottle in an efficient and inexpensive manner.

A further object of this invention is to provide a handle device for molded plastic milk containers that is inexpensive to manufacture, simple to assemble, and inexpensive to maintain.

This invention concerns a handle device for molded plastic milk containers in which tab members are integrally compression-molded with the container and extend therefrom. Elongated apertures are formed through the tab members for receiving a handle. The handle is arch-shaped and has resilient ends extending from the handle body that are angularly displaced with respect to the elongated apertures. Each of the ends has a tip portion with a cross section that is capable of being inserted through one of the apertures when the end is twisted with respect to the handle body to angularly align the tip portion with the aperture. Immediately behind the tip portion is an intermediate portion that has a reduced cross section that enables the end head to spring back to its original angular displacement to interlock the tip portion with the tab member. More particularly each of the handle ends are angularly displaced 90° with respect to the apertures.

Brief description of the drawings

A preferred embodiment of this invention is illustrated in the accompanying drawings, in which:

FIG. 1 is a perspective view of a bottle with a handle device mounted thereon;

FIG. 2 is a fragmentary front view of the bottle showing a tab member extending therefrom;

FIG. 3 is a fragmentary side view showing a portion of the handle connected to the tab member;

FIG. 4 is a fragmentary plan view of the bottle showing a portion of the handle inserted through and interlocked with the tab member; and FIG. 5 is a plan view of the handle.

Description of the preferred embodiment

Referring now in detail to the drawings, there is shown in FIG. 1 a plastic bottle or jug 10 that is especially designed as a container for milk. The jug 10 is blow molded to the shape shown. The jug 10 has a body section 11 and a neck section 12 that has a concaved surface that extends from the body section 11 upwardly and inwardly to an annular opening 13 formed at the top of the jug.

Tab members 14 and 15 are integrally compression molded with the jug 10. Generally, when projections are integrally molded with a container, indentations or cavities are formed on the inner surface of the jug opposite the projections. This is particularly unsatisfactory for milk containers as it is easy for bacteria and other contaminants to be lodged or collect in the cavity. Therefore, it is necessary that the tab members 14 and 15 be compression molded while the jug is being blow molded in order to prevent the formation of a cavity. The tab members 14 and 15 are formed on diametrically opposite sides of the neck 12 and extend upwardly terminating substantially below the opening or top of the jug.

Elongated apertures 16 and 17 are formed perpendicularly through the tab members 14 and 15 respectively in a general vertical orientation. Each of the elongated apertures is substantially rectangular in shape having curved ends for facilitating the attachment of a handle. Each of the apertures has a prescribed length and width.

A handle is attached between the tab members 14 and 15 for facilitating the carriage of the jug 10. The handle 20 is made of a plastic material that is quite durable. The handle 20 has a U-shaped body section 21 with resilient ends 22 and 23 extending therefrom. The resilient ends 22 and 23 are capable of being bent and twisted in relationship to the body section 21. The resilient ends 22 and 23 are normally angularly displaced 90° with respect to the orientation of the apertures 16 and 17.

The body section 21 of the handle includes a central gripping portion 24 having a length substantially the same as the distance between the apertures 16 and 17. The U-shaped body section 21 has leg portions 25 and 26 that are integrally formed with the central gripping portion 24. The lengths of the leg portions 25 and 26 are sufficient to enable the handle 20 to be swung upwardly to a substantially vertical position with the central gripping portion 24 substantially spaced from the opening 13 of the bottle to enable the user to carry the jug without coming into contact with the top of the jug 10. Ribs 27 are formed on the body section 21 to provide structural rigidity to the body portion of the handle. Along the central gripping portion 24, the ribs are formed along one edge to provide a wider gripping surface to distribute the weight of the jug over the user's fingers.

Each of the resilient ends 22 and 23 includes a tip portion 28 that has a cross section that is capable of being inserted through one of the elongated apertures. Each of the tip portions 28 is substantially dart-shaped, having wings 29 extending outwardly therefrom for engaging and interlocking with the tab members. The dart-shape of the tip portions 28 also facilitates the insertion of the tip portions 28 through the tab apertures. Specifically, the width of the tip portion 28 at the wings is greater than the width of the tab apertures but less than the length of the tab apertures. The thickness of the tip portion 28 is less than the width of the tab apertures.

Each of the resilient ends 22 and 23 has an intermediate portion 31 located immediately behind the tip portions 28. The intermediate portion 31 has a reduced cross section that enables the resilient end to spring back to its normal angularly displacement when the intermediate portion extends through the tab apertures. Specifically, the length of the intermediate portion is greater than the thickness of the tab so that the intermediate portion 28 may extend from both sides of a tab member. The width of the intermediate portion 31 is less than the width of the tab apertures to facilitate the rotation of the resilient end after the tip portion has been inserted through the tab aperture. The thickness of the intermediate portion is substantially the same as the thickness of the tab portion.

To attach the handle 20 to the jug 10, the handle 20 may be held in a substantially vertical position with one of the resilient ends 22 and 23 aligned with one of the elongated tab apertures. For purposes of illustration it will be assumed that the resilient end 22 is aligned with the tab apertures 16. The tip portion 28 is then inserted through th aperture 16 with the intermediate portion 31 positioned in the aperture 16. The handle 20 is then pivoted downwardly about the leg 25 to a substantially horizontal position with the end 23 in front of the tab apertures 17. As the handle 20 is pivoted to a horizontal position about leg 15, the tip portion of the resilient end 22 rotates with respect to the aperture 16 to pivot the wings 29 to interlock with the tab 14.

The end 23 is then twisted 90° with respect to the leg 26 and moved forward to insert the tip portion 28 through the aperture 17 and position the intermediate portion 31 in the aperture. The resilient end 23 is then released so that the end will spring back to a 90° angular displacement with respect to the aperture 17. The wings 29 of the end 23 pivot to interlock with the tab 15. In this manner the handle 20 is securely attached to the tab members and is not easily inadvertently disconnected.

As particularly shown in phantom in FIG. 3, when it is desired to carry the jug the user merely grips the central portion 24 and lifts upwardly. The resilient ends 22 and 23 bend to enable the body section 21 to swing upwardly from its normally horizontal position to a vertical position with the central portion 24 over the opening 13. When the handle 20 is released, the handle springs back to a substantially horizontal position below the opening 13. In this manner, the user does not have to grasp the handle to move the handle from the opening 13 in order to pour the milk from the jug. Also, in the filling process it is unnecessary to provide deflecting mechanisms for moving the handle from the opening of the jug to properly fill the container.

If the handle is broken, a new handle may be attached to the bottle without having to throw away the jug. Also, if it becomes necessary for some reason to disconnect or detach the handle 20, it may be removed without injuring or adversely affecting the tabs 14 and 15 and the structural integrity of the jug 10.

What is claimed is:
1. A detachable handle device for bottles comprising:
   (a) diametrically opposed tab members integrally formed with and extending from the bottle, each of said tab members having a vertical aperture formed perpendicularly therethrough; and
   (b) a handle attached between the tab members, said handle comprising a U-shaped body portion with resilient ends angularly displaced 90° to the orientation of the apertures for interlocking with the tab mebers, each of the ends comprises:
      (1) a tip portion that has an enlongated cross section with a major dimension greater than the width of the apertures but less than length of the apertures and a minor dimension less than the width of the apertures so that when the extremity is twisted 90° in relationship to the handle body, it may be inserted through one of the apertures; and
      (2) an intermediate portion behind the tip portion that has a reduced cross section for enabling the head to spring back to its original 90° angular displacement to the aperture with the intermediate portion residing in the aperture to interlock the tip portion with the tab members to secure the handle to the bottle and for enabling bending to allow the body portion of the handle to move upwardly when the handle is grasped to lift the bottle and to swing downwardly when the handle is released.

References Cited
UNITED STATES PATENTS

| | | | |
|---|---|---|---|
| D. 209,926 | 1/1968 | Kelly | D9—291 |
| D. 207,607 | 5/1967 | Kelly | D9—46 |
| 2,537,750 | 1/1951 | Gretschel | 190—58.1 |
| 3,140,814 | 7/1964 | Ellis. | |
| 3,275,366 | 9/1966 | Hidding. | |
| 3,373,924 | 3/1968 | Linda et al. | |

DONALD A. GRIFFIN, Primary Examiner

U.S. Cl. X.R.

D9—46